Figure 1:
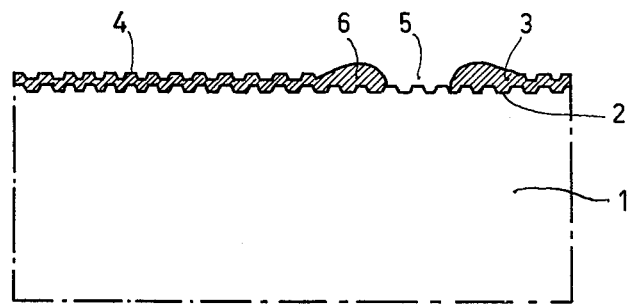

United States Patent [19]

Kivits et al.

[11] 4,318,112
[45] Mar. 2, 1982

[54] OPTICAL RECORDING DISC

[75] Inventors: Petrus J. Kivits; Marinus R. J. de Bont; Adriaan W. de Poorter, all of Eindhoven, Netherlands

[73] Assignee: U.S. Philips Corporation, New York, N.Y.

[21] Appl. No.: 98,436

[22] Filed: Nov. 29, 1979

[30] Foreign Application Priority Data

Sep. 10, 1979 [NL] Netherlands .................. 7906728

[51] Int. Cl.³ .................................. G01D 15/34
[52] U.S. Cl. ........................ 346/135.1; 346/76 L; 369/275; 369/284; 430/945
[58] Field of Search .............. 346/135.1, 76 L; 430/945; 179/100.1 G; 369/275, 284, 286, 288

[56] References Cited

U.S. PATENT DOCUMENTS 3,861,952  1/1975  Tokumoto ............... 346/135.1 X
3,889,272  6/1975  Lou ......................... 346/135.1 X
4,032,691  6/1977  Kido ........................ 346/135.1 X
4,175,145 11/1979  Fechter ................... 346/135.1 X Primary Examiner—Joseph W. Hartary
Attorney, Agent, or Firm—Norman N. Spain

[57] ABSTRACT

An optical recording disc which comprises a disc-shaped substrate plate, for example, a plate manufactured from synthetic resin, for example, polymethylmethacrylate, which has on at least one side an ablative recording layer, for example, an amorphorous layer of a tellurium mixture, in which the substrate on the side of the recording layer has extrinsic instabilities, in particular surface discontinuities. For example, the surface of the substrate is roughened or provided with scratches. The substrate may also be provided with a separate coating layer comprising the discontinuities, for example, an inhomogeneous vapor-deposited layer, a coarse-granular layer of a dye, or a light-cured lacquer layer which has been roughened or provided with scratches.

8 Claims, 6 Drawing Figures

OPTICAL RECORDING DISC

The invention relates to an optical recording disc in which information can be written and read optically, comprising a disc-shaped substrate which has an ablative recording layer on at least one side which upon exposure to energy-rich light modulated according to the information melts in the exposed places and forms holes.

Such a disc is disclosed inter alia for example in Netherlands patent application No. 7,607,997. The disc described in said specification comprises a substrate plate on which a recording layer is present comprising at least 30 at .% Se and/or Te. Upon exposure to modulated laser light, liquid areas are formed in which the liquid in the exposed area then retracts while forming a hole which is surrounded by an upright edge of material originating from the liquid area.

It is the object of the present invention to increase the sensitivity of materials for recording of information so that materials which previously were insensitive and in which an information bit (hole) could be provided only by the use of a comparatively large amount of laser light energy. For example to provide a means whereby amorphous materials on the basis of tellurium compounds, can also be used readily. This means that information bits (holes) can also be formed in such materials with a favourable amount of laser light.

Another object of the present invention is to provide an optical recording disc in which very small holes can be formed with a small amount of laser light thereby increasing the information density of the disc.

A further object of the present invention is to provide an optical information disc in which small holes of different diameters can be formed with a small amount of laser light energy. This permits an analog recording of information which also results in a much larger information density.

The present invention is based firstly on applicant's recognition that a comparatively high energy must be overcome to initiate a hole in an ablative recording layer. This comparatively high energy barrier cannot exclusively be overcome by thermal activation of the liquid area.

In non-prepublished Netherlands patent application No. 7,902,542 corresponding to U.S. application Ser. No. 58,213 filed July 16, 1979, calculations are disclosed with respect to the required activation energy and associated minimum hole diameter. It is also stated in the Netherlands patent application that the Marangoni effect, that is to say a destabilizing process in a liquid film in which as a result of a gradient in the surface energy a mass transport occurs to those parts of the film having the highest surface energy, provides an important contribution to the required hole inititation energy. According to the Netherlands patent application, means are disclosed for optimizing the Marangoni effect.

Applications have now gained the further recognition that extrinsic instabilities, i.e. instabilities which lie outside the recording layer in which the holes are formed, give a strong promotion of the hole initiation.

It has been found experimentally that when employing the known recording discs, the liquid areas provided in the ablative recording layer by means of laser light have comparatively large diametrical dimensions before the liquid of said areas retracts to form holes having ridges. By providing extrinsic instabilities holes are formed in liquid areas (much smaller diametrical dimensions) obtained in the recording layer by exposure to laser light. This means that less laser light energy is required and a smaller hole will be obtained. It also means that ablative recording materials which so far have been too insensitive become useful.

More particularly the invention relates more in particular to an optical recording disc of the type mentioned in the opening paragraph which is characterized in that the extrinsic instabilities are provided at the surface of the substrate adjacent to the recording layer.

By way of example it can be stated that holes having a diameter of approximately 0.3 $\mu$m can be provided by means of laser light in an amorphous recording layer of a tellurium alloy, for example a Ge/Te alloy, which has a thickness of 30–40 nm. The amount of laser light energy per hole (information bit) then is roughly 0.4 nJ and originates, for example, from a laser having an emission wavelength of 647 nm, a power of 5 mW on the recording layer and a pulse time of 75 ns. When the same laser is used but with a pulse time of 100 ns, liquid areas are obtained in the recording layer of larger diametrical dimensions which result in a hole having a diameter of approximately 1.0 $\mu$m. This means that it is possible according to the invention to obtain holes of different diametrical dimensions in accordance with the amount of laser light energy used, of which holes the largest also still have a small diameter in the range up to, for example, 1.5 $\mu$m.

In addition to binary information recording the invention also provides an analog information recording, for example, a ternary recording (large hole, small hole, no hole) which has a significantly higher information density. As a matter of fact, for example, 8 bits are necessary for the binary (digital) recording of 200 characters ($2^7 < 200 < 2^8$) and only 5 bits are necessary for ternary recording ($3^4 < 200 < 3^5$).

The extrinsic instability may be, for example, a chemical impurity in the surface of the substrate adjoining the recording layer, for example, atoms diffused in the substrate surface.

In a favourable embodiment of an optical recording disc of the invention the surface of the substrate adjoining the recording layer contains a surface discontinuity at least in those locations where holes are formed in the overlying recording layer upon exposure.

In this favourable embodiment the extrinsic instability has a mechanical character. At the area of the discontinuity the surface shows a difference in levels as a result of a local recess of the surface. The strong effect the surface discontinuity has on the hole initiation as a result of which, as already said, the liquid areas in the recording layer burst open with much smaller diameter and hence much sooner, are still not fully explained. However it is believed that this phenomenon can partly be explained as a result of an increased internal liquid pressure in the liquid area caused by laser light. At the area of the discontinuity the surface shows a ridge which, compared with a flat surface, has a reduced radius of curvature. The inwardly directed liquid pressure is inversely proportional to the radius of curvature and is significantly increased at the area of the discontinuity.

It is of importance for the radius of curvature of the substrate surface to be as small as possible at the location of the discontinuity and hence for the above-mentioned ridge to make an angle with the substrate surface which is as acute as possible.

For a better understanding of the phenomenon it may be noted that in applicant's opinion there exists an analogy with the action of a boiling stone which as is generally known promotes the initiation of a boiling process.

In a further favourable embodiment of the recording disc with which excellent results are obtained, the surface discontinuity has diametrical dimensions of 30 to 300 nm and a level difference with the substrate surface of 8 to 80 nm, the recording layer having a thickness in the order of magnitude of 30–40 nm.

The term diametrical dimensions is to be understood to also include the width dimensions of, for example, scratches provided in the substrate surface.

In a favourable practical embodiment of the disc in accordance with the invention a substrate of glass or synthetic resin is used whose surface adjoining the recording layer has been roughened or provided with scratches chemically or mechanically, or of which the surface adjoining the recording layer is a copy of the surface of a matrix comprising the surface discontinuity.

The chemical roughening can be achieved by treating the substrate surface with an etchant. As an example the roughening of a substrate manufactured from polymethyl methacrylate may be mentioned in which the substrate surface is treated for 5 to 10 seconds with a suitable etchant, in particular perchloric acid.

The mechanical roughening may be obtained according to known methods in which, for example, the substrate surface is subjected to a bombardment of hard particles, as is known, for example, by the name of sand-blasting.

Preferably a substrate is employed the surface of which is a copy of a matrix surface comprising the discontinuity. The manufacturing process of the recording disc is considerably simplified by this procedure because it is not necessary for each substrate disc to be roughened individually. Quite a large number of suitable substrate discs can be manufactured according to usual techniques by means of a matrix which comprises in its surface a negative of the discontinuity desired in the substrate surface.

A suitable technique is, for example, a compression technique in which a quantity of a plastic synthetic resin, for example PVC, placed centrally on a lower matrix, is deformed at elevated temperature and pressure to a substrate disc by means of a die having the desired discontinuity. Instead of the dye, the lower matrix may be provided with the surface discontinuity. Alternatively, both matrices may have a surface discontinuity. Another technique is an injection moulding technique in which a liquid composition of, for example, a plastic synthetic resin, for example in particular polymethyl methacrylate, is compressed in a mould, the moulding cavity of the mould having one or two matrices comprising the surface discontinuity.

The matrix is usually manufactured from metal, for example, nickel, and can be provided with a negative of the desired surface discontinuity, as already said chemically or mechanically. It is also possible to take the desired surface roughness into account during the manufacture of the matrix in which a master plate, which is a glass plate having a photolacquer in the desired configuration, is first covered in an electroless manner and is then electroplated with metal, after which the grown metal peel is removed from the master plate. In this manner it may be ensured that the surface of the photolacquer has the desired roughness due to the choice of photolacquer and photolacquer developer.

In another favourable embodiment, the surface of the substrate facing the recording layer comprises a coating layer containing the surface discontinuity.

A suitable coating layer is a non-continuous inhomogeneous, vapour-deposited layer. During the vapour deposition, a so-called island stage is reached in the first instance, in which the vapour-deposited material is deposited on the substrate to be coated as islands (insulae) which are distributed regularly over the substrate surface. A vapour deposition layer in the island stage can readily be used as a coating layer. An example hereof is a vapour-deposited layer of Au in the island stage.

Another suitable coating layer is a coarse granular vapour-deposited layer of dye. A typical example hereof is a layer of vapour-deposited vanadyl phtalocyanine in which during the vapour deposition the temperature of the substrate to be coated is maintained at a minimum value of approximately 60–80° C. As a result of this tempering, a coarse granular layer of vanadyl phtalocyanine is obtained which can readily be used as the coating layer containing the surface discontinuity.

In another preferred form of the disc according to the invention the coating layer is a light-cured layer of lacquer of which the surface adjoining the recording layer is roughened or provided with scratches mechanically or chemically or the surface of which adjoining the recording layer is a copy of the surface of a matrix comprising the surface discontinuity.

The light-cured lacquer layer maybe, for example, a layer of ultraviolet light-cured lacquer on the basis of acrylic acid esters. Preferably the lacquer layer is provided on the substrate by means of a matrix which has the desired surface discontinuity. For this purpose a liquid, light-curable lacquer layer is provided on the matrix surface having the discontinuity and the substrate plate is then placed on the lacquer layer. The lacquer layer is exposed to ultraviolet light via the substrate or via the matrix, after which the substrate and the cured lacquer layer connected thereto and in which the texture of the matrix surface is copied, is removed from the matrix. The lacquer layer is finally provided with an amorphous recording layer, for example, a vapour-deposited layer of tellurium-germanium in a thickness of 30–40 nm. It is to be noted that for exposing the lacquer via the substrate or via the matrix, the substrate and the matrix, respectively, should be transparent to the ultraviolet light used. To be preferred is a transparent substrate manufactured from glass or a transparent synthetic resin, for example, polymethylmethacrylate, polysulphon, polycarbonate or PVC.

In still another preferred embodiment actually reduced to practice, the substrate on the side of the recording layer has an optically readable servo track which partly has a relief structure of servo areas situated alternately at a higher and lower level.

The servo track generally is spiral-like or constructed from concentric circles, the servo areas situated alternately at a higher and a lower level giving the track a crenelated profile. The longitudinal dimensions of the servo areas which show the form of blocks and pit, vary in agreement with the stored servo data and are roughly from 0.3 to 3μ. The difference in height between blocks and pits is roughly 0.1 μm.

The device according to the invention having a servo track has the significant advantage that the recording of information in the recording layer is accurately controlled by the servo data present in the servo track which comprise, for example, order with respect to the velocity of information recording and the location of recording. The laser light beam scanning the servo track via the transparent substrate, hereinafter referred to as servo laser light, transfers the servo data to a control mechanism which switches the laser light beam at a considerably higher energy content with which the desired information can be recorded in the recording layer.

The recording of information preferably takes place in those parts of the recording layer which are situated on the servo track between the servo data.

The servo track is provided in the substrate by means of a matrix which is provided with a servo track according to known and above-mentioned methods, for example, a moulding method or an injection moulding process. It is recommendable to use a matrix which in addition to the servo track also has the desired surface discontinuity. This is not necesssary because the substrate comprising a servo track can be roughened mechanically or chemically in an after-treatment on the side of the servo track or be provided with scratches or be provided differently with a coating layer comprising the surface discontinuity, for example, a vapour-deposited layer of Au in the insula stage or a coarse-granular layer of vanadyl phtalocyanine. The last-mentioned method, however, requires an extra process step.

In an attractive embodiment the servo track is provided in a light-cured lacquer layer which is present on the substrate and also comprises the surface discontinuity. A recording disc according to the last-mentioned embodiment can be manufactured by providing a lacquer layer of a light-curable lacquer on the surface of a matrix comprising both the servo track and the surface discontinuity, then providing a transparent substrate plate, exposing the lacquer layer via the substrate plate to ultra-violet light, removing the substrate plate and the cured lacquer layer connected thereto in which the servo track and the surface discontinuity have been copied from the matrix surface and providing the cured lacquer layer with a recording layer. A matrix with servo track can be manufactured by providing in the photolacquer layer of the master plate a servo track by exposure and development, which track is then copied in the grown metal peel (father plate), after which successively further galvanic prints, for example mother plates, son plates and matrices are manufactured. Before providing the surface discontinuity, the matrix having a servo track may be roughened or be provided with scratches chemically or mechanically or be covered with a coating layer comprising the discontinuity, for example, a vapour-deposited Au layer in the insula stage or a coarse granular layer of vanadyl phtalocyanine in a thickness, for example, of 30 nm.

The recording layer used in the recording disc according to the invention, for example, is a metallic recording layer or a layer of a chalcogenide glass which can be provided by a vapour deposition or sputtering process and has a thickness of approximately 30–40 nm. A very suitable recording layer is an amorphous layer of a mixture of tellurium with one or several elements selected from the group As, Sb, Bi, Ge, Sn, Si, Ga, In, Tl, Se and S. Readily useful tellurium-containing recording layers are described inter alia in the non-prepublished Netherlands patent application No. 7,902,543 corresponding to the U.S. patent application Ser. No. 5,677, filed July 1, 1979 in the name of applicants.

The substrate used in the recording disc according to the invention preferably is transparent and is manufactured from glass or from the above-mentioned transparent synthetic resin. In such a disc, information can be recorded or read via the substrate by means of laser light so that the contaminations such as dust particules, present on the surface of the disc fall beyond the depth of focus of the objective which focuses the laser light on the recording layer.

Figure 2:
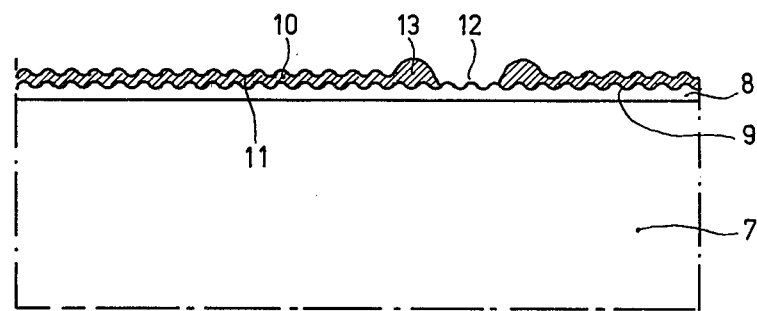
Figure 3:
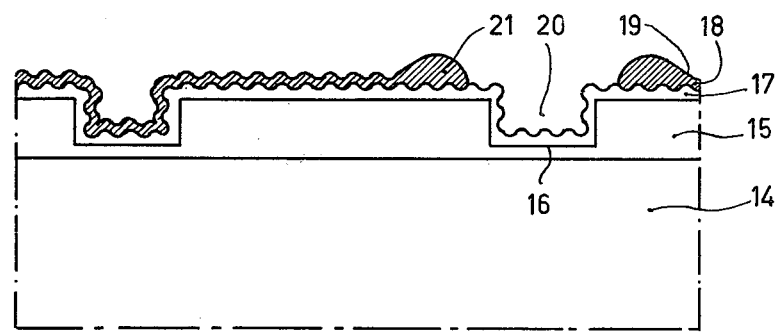
Figure 6:
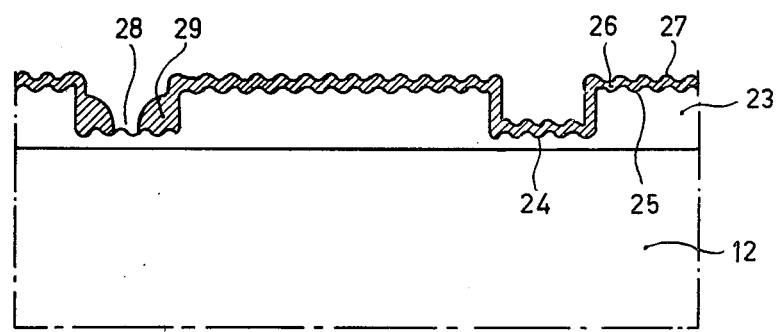
Figure 4:
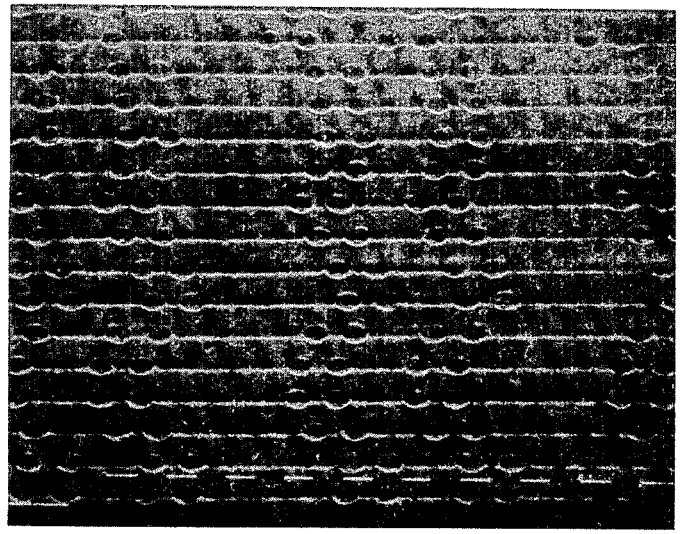
Figure 5:
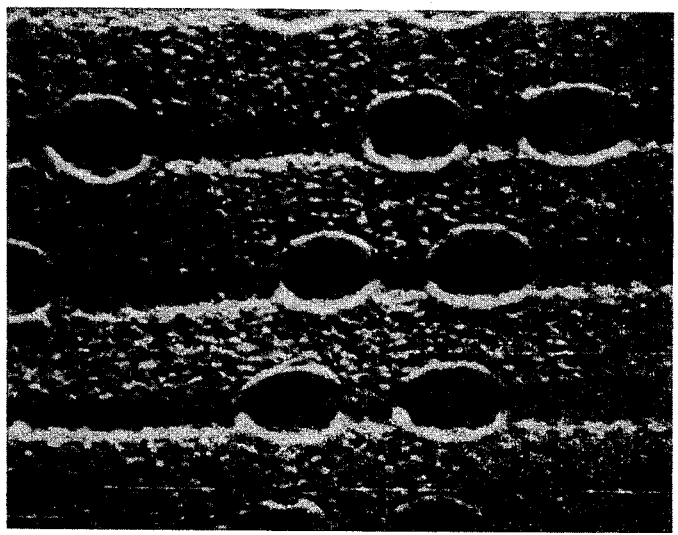

The invention will now be described in greater detail with reference to the drawing, in which FIG. 1 is a cross-sectional view of a recording disc according to the invention, FIG. 2 is a cross-sectional view of another embodiment of the information disc, FIG. 3 is a cross-sectional view of still another favourable embodiment of the information disc, FIG. 4 is a photograph of a part of the surface of the information disc shown in FIG. 3 having information, FIG. 5 is an enlargement of the photograph shown in FIG. 4, and FIG. 6 is a cross-sectional view of a further embodiment of the information disc according to the invention.

Reference numeral 1 in FIG. 1 denotes a $\mu$m thick substrate plate of polymethylmethacrylate roughened mechanically on one side. The resulting scratch profile 2 is shown diagrammatically in the Figure. The scratches have a width of approximately 50 nm and a depth of 20 nm. The surface provided on such a surface discontinuity comprises a vapour-deposited recording layer 3 of $Te_1 Se_1 Sb_1$ in a thickness of 30 nm. The surface of recording layer 3 remote from the substrate plate shows a scratch profile 4 which corresponds to the scratch profile 2. In this connection it is to be noted that upon vapour-depositing the recording layer, the resulting layer follows the profile of the substrate surface.

For recording information, the optical recording disc shown in FIG. 1 is exposed, via substrate plate 1, to pulsated laser light originating from a laser having a power of 2.3 mW on the recording layer, an emission wavelength of 800 nm and a pulse time of 500 ns. As a result of the exposure for 500 ns, a hole 5 is formed in the recording layer 3. The resulting hole has a diameter of 0.2 $\mu$m and comprises a ridge portion 6 which contains recording material which in a liquid form originates from the hole and has then solidified to form a ridge portion 6.

Reference numeral 7 in FIG. 2 denotes a plate of polymethyl methacrylate having a thickness of 1 mm which comprises on one side a vapour-deposited coating layer 8 of vanadyl phtalocyanide the surface of which remote from the plate 7 shows a coarse-granular structure 9. A structure detail of the coarse-granular surface has diametrical dimensions of approximately 70–100 nm. The coarse-granular layer is made by vapour-depositing vanadyl phtalocyanide at normal temperature (room temperature) and then keeping the vapour deposited layer at a temperature of 80° C. for several hours. It is also possible during the vapour deposition of vanadyl phthalocyanide, to keep the plate at a temperature of 80° C. The vapour-deposited coating layer 8 has a thickness of 26.5 nm and supports a vapour-deposited recording layer 10 of $Te_1 Se_1 Sb_1$ in a thickness of 30 nm. The recording layer also has a coarse granular structure 11 which corresponds to that of layer 8.

For recording information, the recording layer 10 is exposed to pulsated laser light originating from a laser having a power of 3 mW on the recording layer, an emission wavelength of 647 nm and a pulse time of 1 μs. As a result of the exposure for 1 μs, a hole 12 is formed in the recording layer which is surrounded by a ridge portion 13 of recording material originating from the hole. The hole 12 has diametrical dimensions of 0.75 μm. In the absence of coating layer 8 in which the recording layer of $Te_1Se_1Sb_1$ provided directly on the plate 7 does not show a coarse-granular surface structure, the minimum hole dimension is at least 1.3 μm.

Reference numeral 14 in FIG. 3 denotes a 1 mm thick substrate plate of polymethyl methacrylate which is provided on one side with an ultra-violet-light-cured lacquer layer 15 in which a servotrack 16 is provided. Lacquer layer 15 is provided by providing a matrix surface comprising the servo track with a layer of liquid, light-curable lacquer on the basis of acrylic acid esters, laying hereon the glass plate, then curing the lacquer layer with ultra-violet light via the substrate and finally removing the assembly of glass plate and cured lacquer layer connected thereto in which the servo track has been couped, from the matrix surface. The servo track has a width of approximately 0.6 μm and a depth of 0.2 μm. Lacquer layer 15 has a coarse-granular layer of vanadyl phtalocyanine 17 in a thickness of 66 nm obtained by vapour-depositing vanadyl phtalocyanine at room temperature and then tempering the resulting layer at 80° C. for 10 hours. Layer 17 in turn comprises a recording layer 18 of $Ge_{15}Te_{85}$ in a thickness of 30 nm. The surface of layer 18 shows a structure 19 which corresponds to that of layer 17.

For recording information, the recording layer 18 at the area of the servo track 16 is exposed via the substrate 14 to pulsated laser light originating from a laser having a power of 2 mW on the recording layer, an emission wavelength of 800 nm and a pulse time of 500 ns. As a result of the exposure for 500 ns, a hole 20 is formed in the recording layer 18 having a diameter of 1.0 μm and surrounded by a ridge portion 21 of recording material originating from the hole 20. If no coarse-granular coating layer 17 of vanadyl phtalocyanine is used and the recording layer 18 consequently does not show a coarse-granular surface texture, a hole is formed in the recording layer only with a laser light power of 4.6 mW and a pulse time of 500 ns, which hole then has a diameter of 1.5 μm.

FIG. 4 is a photograph of a part of the surface of the recording layer shown in FIG. 3. The various servo tracks and the holes (information bits) provided in the recording layer at the area of the servo tracks and having a ridge portion are very clearly visible. The coarse-granular surface texture of the recording layer can also be readily observed. The broken line present in the lower part of the photograph is a measure line, each part of the line shown having a length of 1 μm.

FIG. 5 is further enlargement of FIG. 4 in which notably the coarse-granularity of the recording layer is clearly observable.

Reference numeral 12 in FIG. 6 denotes a 1 mm thick substrate plate of polymethyl methacrylate which is provided on one side with an ultraviolet-light-cured lacquer layer 23 having a servo track 24 and a coarse granular (roughened) surface 25. Lacquer layer 23 with servo track 24 and rough surface 25 has been obtained by providing on a coarse-granular matrix surface comprising the servo track a light-curable lacquer on the basis of, for example, acrylic acid esters, laying thereon the substrate plate, then curing the lacquer layer via the substrate with ultraviolet light and removing from the matrix the resulting assembly of substrate plate and cured lacquer layer connected thereto in which the servo track and the surface texture of the matrix have been copied. A matrix with servo track and coarse-granular surface can be manufactured, for example, by vapour-depositing at a temperature of 80° C. a layer of vanadylphtalocyanine on a nickel matrix having a smooth surface and comprising the servo track.

Lacquer layer 23 has a vapour-deposited recording layer 26 of $In_{50}Bi_{50}$ in a layer thickness of 30 nm. Recording layer 26 has a surface texture 27 which corresponds to that of layer 23.

For recording information, recording layer 26 is exposed via substrate 22 to pulsated laser light originating from a laser having a power of 2.5 mW on the recording layer, an emission wavelength of 676 nm, and a pulse time of 100 ns. As a result of the exposure for 100 ns, a hole 28 is formed in the recording layer 26 having a diameter of 0.2 μm and comprising a ridge portion 29. When using a laser light power of 8.5 mW and a pulse time of 100 ns, a hole is obtained having a diameter of 0.75 μm so that analog recording of information is possible.

What is claimed is:

1. An optical recording device in which information can be recorded and read optically comprising a substrate having on at least one side an ablative recording layer which upon exposure to energy-rich light modulated according to the information melts in exposed places and forms holes characterized in that at the surface of the substrate facing the recording layer there is present a surface discontinuity having a diametrical dimension of 30 to 300 nm and a level difference with the substrate surface of 8 to 80 nm, the recording layer having a thickness in the order of magnitude of 30–40 nm.

2. An optical recording device as claimed in claim 1, characterized in that the substrate is transparent and contains, on the surface facing the recording layer an optical reading servo track having a relief structure of servo areas situated alternatively at a higher and a lower level.

3. An optical recording device as claimed in claim 1, characterized in that the substrate is a substrate manufactured from a synthetic resin or glass whose surface adjoining the recording layer has been roughened or provided with scratches chemically or mechanically or whose surface adjoining the recording layer is a copy of the surface of a matrix comprising the surface discontinuity.

4. An optical recording device as claimed in claim 1, characterized in that on the side of the recording layer the substrate has a coating layer comprising the surface discontinuity.

5. An optical recording device as claimed in claim 4, characterized in that the coating layer is non-continuous, inhomogeneous vapour-deposited layer.

6. An optical recording device as claimed in claim 4, characterized in that the coating layer is a coarse-granular vapour-deposited layer of dye.

7. An optical recording device as claimed in claim 4, characterized in that the coating layer is a light-cured lacquer layer of which the surface adjoining the recording layer has been roughened or provided with scratches mechanically or chemically or of which the surface adjoining the recording layer is a copy of the surface of a matrix comprising the surface discontinuity.

8. An optical recording device as claimed in claim 7, characterized in that the light-cured lacquer layer also comprises an optically readable servo track.

* * * * *

UNITED STATES PATENT AND TRADEMARK OFFICE
CERTIFICATE OF CORRECTION

PATENT NO. : 4,318,112
DATED : March 2, 1982
INVENTOR(S) : PETRUS J. KIVITS ET AL It is certified that error appears in the above—identified patent and that said Letters Patent is hereby corrected as shown below:

Line 5 of the abstract "amorphorous" should be --amorphous--.

Signed and Sealed this

Twenty-ninth Day of June 1982

[SEAL]

Attest:

Attesting Officer

GERALD J. MOSSINGHOFF

Commissioner of Patents and Trademarks